United States Patent
Joshi et al.

(10) Patent No.: US 9,416,752 B2
(45) Date of Patent: Aug. 16, 2016

(54) GAS TURBINE EXHAUST HAVING REDUCED JET NOISE

(75) Inventors: Ninad Joshi, Brampton (CA); Gaetan Girard, Outremont (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1093 days.

(21) Appl. No.: 13/407,055

(22) Filed: Feb. 28, 2012

(65) Prior Publication Data

US 2013/0219895 A1    Aug. 29, 2013

(51) Int. Cl.
  *F02K 1/82* (2006.01)
  *F01D 25/30* (2006.01)

(52) U.S. Cl.
  CPC .............. *F02K 1/827* (2013.01); *F01D 25/30* (2013.01); *F05D 2250/63* (2013.01); *F05D 2260/96* (2013.01); *F05D 2300/516* (2013.01); *Y02T 50/671* (2013.01)

(58) Field of Classification Search
  CPC ....... F01D 25/30; F02K 1/827; Y02T 50/671; F05D 2300/516; F05D 2250/63; F05D 2260/96
  USPC ................... 60/262, 264, 226.1, 226.2, 771; 181/213, 220; 239/265.19
  See application file for complete search history.

(56) References Cited

U.S. PATENT DOCUMENTS

| | | | |
|---|---|---|---|
| 2,737,019 A | 3/1956 | Billman | |
| 2,944,623 A | 7/1960 | Bodine, Jr. | |
| 2,988,302 A | 6/1961 | Smith | |
| 3,255,583 A * | 6/1966 | Eastman | 60/231 |
| 3,279,192 A * | 10/1966 | Hull, Jr. et al. | 60/264 |
| 3,578,264 A | 5/1971 | Kuethe | |
| 3,589,274 A | 5/1971 | Kuethe | |
| 3,596,465 A | 8/1971 | Paine et al. | |
| 3,611,724 A | 10/1971 | Kutney | |
| 3,637,140 A | 1/1972 | Palovchik | |
| 4,410,065 A | 10/1983 | Harvey | |
| 5,492,448 A * | 2/1996 | Perry | B64C 3/14 416/228 |
| 5,655,361 A | 8/1997 | Kishi | |
| 6,248,423 B1 | 6/2001 | Clarke et al. | |
| 6,612,106 B2 * | 9/2003 | Balzer | F02K 1/48 60/204 |
| 6,672,424 B2 | 1/2004 | Gadefait et al. | |
| 6,813,877 B2 | 11/2004 | Birch et al. | |
| 7,578,132 B2 | 8/2009 | Webster | |

(Continued)

FOREIGN PATENT DOCUMENTS

JP    2001-50110    *    2/2001

*Primary Examiner* — Ted Kim
(74) *Attorney, Agent, or Firm* — Norton Rose Fulbright Canada LLP (57) ABSTRACT

A gas turbine engine has an engine core and an annular by-pass duct, within a surrounding nacelle. An exhaust nozzle of the nacelle includes a selectively deployable noise-reduction section on an inner surface thereof. The noise-reduction section includes an inflatable envelope comprising a fixed outer wall and a displaceable inner wall. At least projections on the inner wall are inwardly displaced when the envelope is pressurized and retracted radially outwardly when the envelope is de-pressurized. When the envelope is pressurized, the inner wall includes portions that project to form a rough surface on the inner surface of the nacelle exhaust nozzle. This thickens the boundary layer and reduces the speed of the gas flow at the outer radius of the nozzle, thus reducing the differential velocity with the ambient air, which reduces the gradient throughout the shear layer thus reducing the noise level of the engine.

12 Claims, 5 Drawing Sheets

(56) References Cited

U.S. PATENT DOCUMENTS

| | | |
|---|---|---|
| 7,578,369 B2 | 8/2009 | Francisco et al. |
| 7,587,899 B2 | 9/2009 | Song et al. |
| 7,735,601 B1 | 6/2010 | Stieger et al. |
| 7,784,283 B2 | 8/2010 | Yu et al. |
| 9,002,484 B2* | 4/2015 | Hyde et al. .................. 244/201 |
| 2004/0237534 A1 | 12/2004 | Webster et al. |
| 2005/0229585 A1* | 10/2005 | Webster ........................ 60/262 |
| 2008/0272228 A1 | 11/2008 | Mengle et al. |
| 2010/0187361 A1* | 7/2010 | Rawlings et al. ............ 244/130 |

* cited by examiner

GAS TURBINE EXHAUST HAVING REDUCED JET NOISE

TECHNICAL FIELD

The present invention relates to gas turbine engines and more particularly to exhaust noise reduction.

BACKGROUND

The exhaust jet of a gas turbine engine remains a significant noise source, particularly at high power conditions, despite the use of high by-pass ratios in modern aircraft engines which has brought several significant benefits particularly in fuel efficiency and noise. Jet noise in a turbofan engine is caused by the interaction of the air streams within the engine and also with the surrounding air. The jet noise comprises turbulent mixing noise, which is at least in part caused by: a) mixing of the core and bypass flow streams; and b) mixing of the mixed stream with the ambient air creating a shear layer. The turbulent shear flow mixing includes two types of noise, the first caused by fine scale turbulence and the second caused by large scale eddies.

The prior art proposes reducing noise levels by modifying the exhaust nozzle area, such as by including bumps or wave-like surfaces or by adding chevron shaped tabs on the exhaust nozzle.

SUMMARY

There is provided, in accordance with a first aspect, a gas turbine engine comprising: an engine core having a core exit nozzle within an annular by-pass duct defined within a surrounding nacelle, the nacelle having an exhaust nozzle at an aft end thereof; a selectively deployable noise-reduction section on an inner surface of the aft end of the nacelle exhaust nozzle, the noise-reduction section including at least one inflatable envelope, projections deployable from the inner wall of the nacelle exhaust nozzle to form a rough surface at the loft line of the inner wall when the envelope is pressurized and the projections are retracted when the envelope is de-pressurized; means are provided to retain the inner wall in the loft line, the so formed rough surface effectively thickens the boundary layer to reduce the speed of the mixed flow of engine exhaust and by-pass air at the outer radius of the nozzle to reduce the differential velocity with the ambient an thus reducing the jet noise level of the engine.

In accordance with another aspect, there is also provided a gas turbine engine comprising an engine core and an annular by-pass duct defined between the engine core and a surrounding nacelle, the nacelle having an exhaust nozzle at an aft end thereof through which exhaust gas flow exits, the nacelle exhaust nozzle having a selectively deployable noise-reducing component therewithin, the noise-reducing component including an annular perforated sleeve positioned to coincide with the inner nacelle loft line and circumscribing a mixed exhaust gas flow exiting the nacelle, the annular perforated sleeve being disposed radially inwardly of a displaceable inner wall of an inflatable envelope, the inner wall being radially displaceable between a deployed position wherein noise-reduction is active and a retracted position wherein noise-reduction is inactive, the inner wall being displaced from the retracted position to the deployed position when the inflatable envelope is pressurized thereby forcing portions of the inner wall to project through openings in the perforated sleeve and into the exhaust gas flow to form a rough surface at the loft line of the nacelle exhaust nozzle, causing a reduction in the noise level of the gas turbine engine.

There is also provided, in accordance with another aspect, a gas turbine engine comprising an engine core and an annular by-pass duct defined within a surrounding nacelle, the nacelle having an exhaust nozzle which includes a selectively deployable noise-reduction section on an inner surface thereof, the noise-reduction section defining an inflatable envelope comprising a fixed outer wall, a displaceable inner wall radially inward of the fixed outer wall, and an annular perforated sleeve radially inward of the inner wall and facing an exhaust gas flow exiting the exhaust nozzle, at least a portion of the inner wall being radially inwardly displaced when the envelope is pressurized and retracted radially outwardly when the envelope is de-pressurized, wherein the inner wall including projections thereon that extend through openings in the perforated sleeve and extend into the exhaust gas flow to form a rough surface on the inner surface of the nacelle exhaust nozzle when the envelope is pressurized, thereby reducing a level of jet noise produced, and wherein said projections being retracted upon depressurization of the envelope such that the inner surface is smooth thereby increasing the level of the jet noise but decreasing fuel consumption.

There is further provided, in accordance with yet another aspect, a method for reducing the level jet noise produced by a gas turbine engine having a engine nacelle from which an exhaust gas flows, comprising pressurizing an inflatable portion of an exit nozzle of the engine nacelle to displace an inner wall of the inflatable portion radially inwardly such that projecting portions thereof protrude into the exhaust gas flow at the loft line of the nacelle so as to form a rough surface at the loft line to thereby reduce the exhaust velocity as it mixes with ambient free air shear surrounding the nacelle and thus reduce the level of jet noise produced; restricting the pressurized air to the inflatable portion at a predetermined altitude so that flight will proceed with the projecting portions retracted from the loft line and withdraw within the exit nozzle of the engine nacelle; and initiating the pressurized fluid to the inflatable portion in preparation for landing thereby re-forming the rough surface within the exit nozzle of the engine nacelle to thereby reduce the level of jet noise produced during landing.

BRIEF DESCRIPTION OF THE DRAWINGS

Reference is now made to the accompanying figures in which:

FIG. 5b is an exploded view of a detail shown in FIG. 5a;

DETAILED DESCRIPTION

Figure 1:
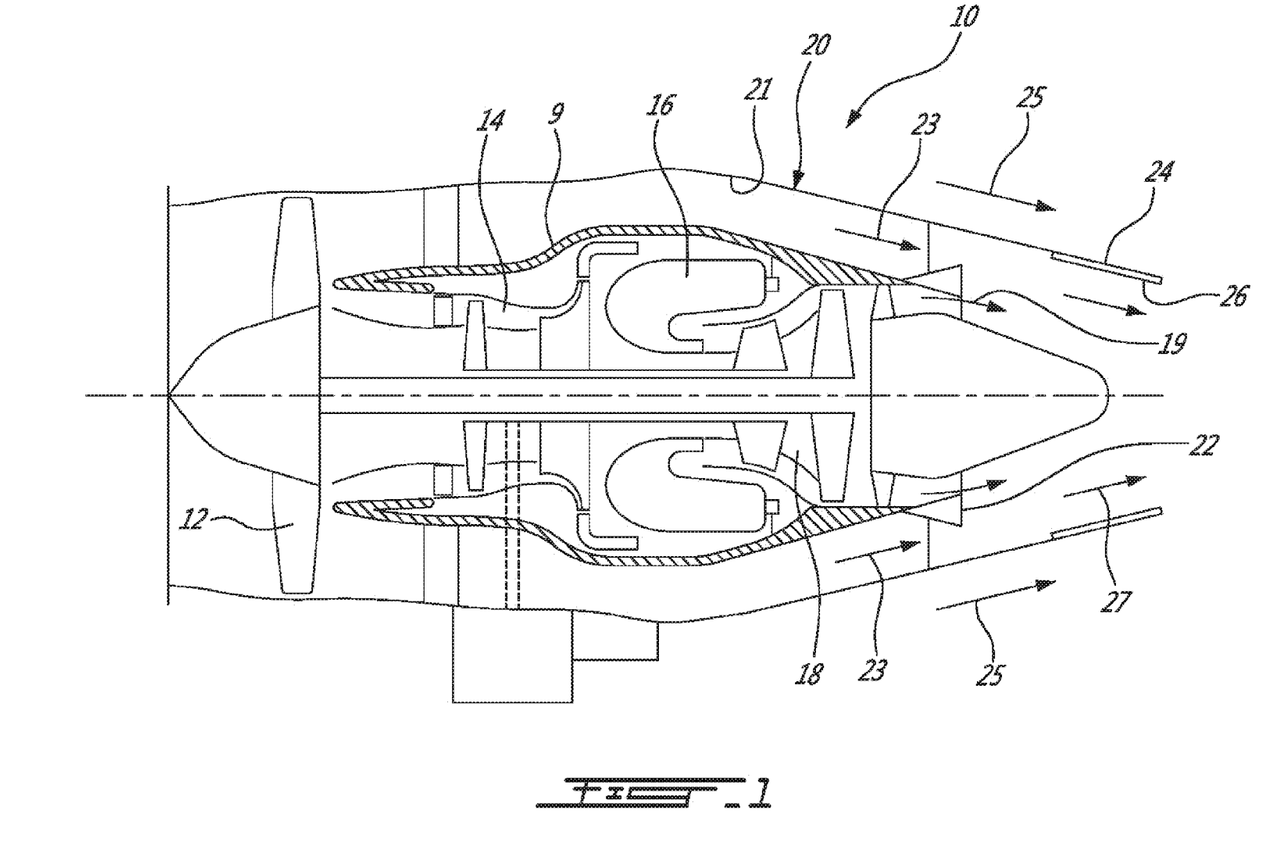
FIG. 1 is a schematic cross-sectional view of a turbofan engine.

FIG. 1 schematically depicts a gas turbine engine 10, such as a turbofan for example, of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 including at least one turbine for extracting energy from the combustion gases.

Bypass duct 21, defined within the surrounding engine nacelle 20, may define an annular passage (e.g. defining bypass gas path 23) through which some of the airflow through engine 10 to bypass the core section 9 of engine 10. Although the illustrated gas turbine engine 10 of FIG. 1 is as a turbofan engine, it is understood that the devices, assemblies and methods described herein can also be used in conjunction with other types of gas turbine engines such as, for example, turboshaft and/or turboprop engines.

The turbofan engine 10 includes a core exhaust nozzle 22 located downstream of the turbine 18 at the aft of the engine, which is at least partially surrounded by the annular by-pass duct 21 through which the by-pass air 23 flows. The core engine gas flow 19 from the engine exhaust nozzle 22 meets and mixes with the bypass air flow 23 from the bypass duct 21 within the exhaust nozzle 24 of the nacelle 20 to form a mixed exhaust gas flow 27. This mixed exhaust gas flow then exits the nacelle 20 of the engine 10 and mixes with the surrounding ambient free air stream 25.

Figure 2:
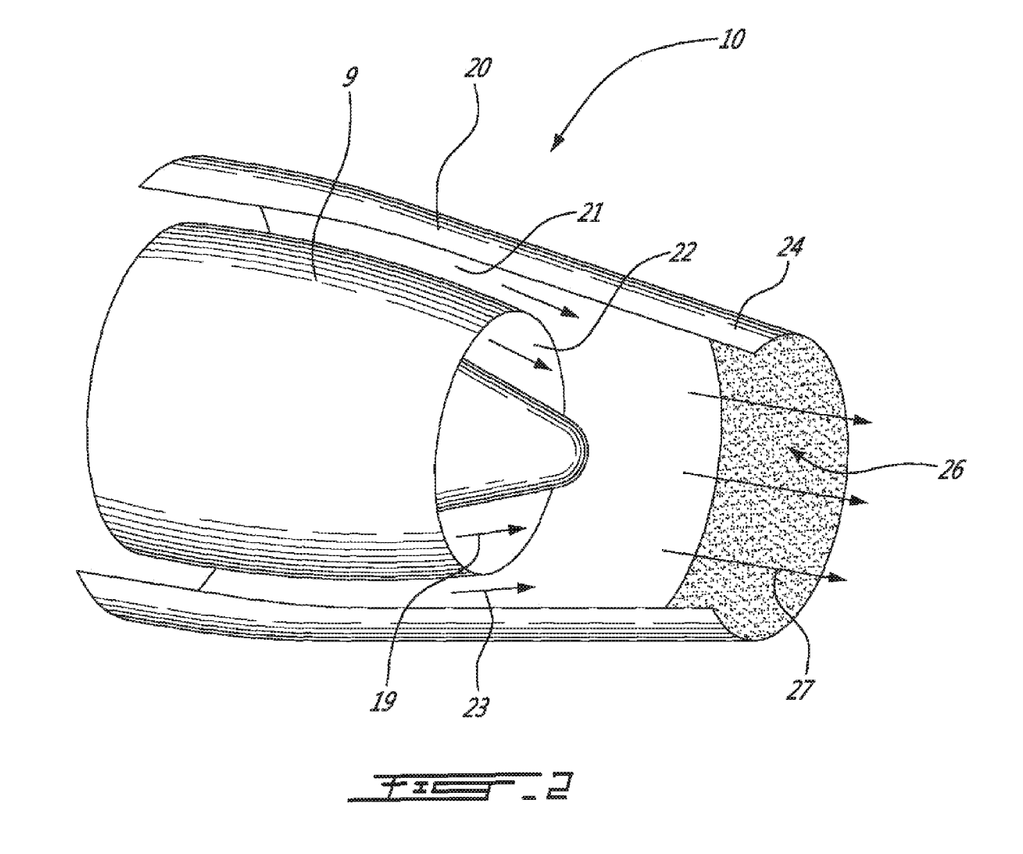
FIG. 2 is a schematic cut-away view of a turbofan engine exhaust section.

As seen in both FIG. 1 and FIG. 2, the aft portion of the nacelle 20 which defines the exhaust nozzle 24 includes an annular section 26 therewithin which circumscribes and faces the mixed exhaust gas flow (i.e. the mixed core engine exhaust flow 19 and the bypass air flow 23) and which, as will be described in more detail below, is said to be "expandable" in that it permits a flow-modifying element to be selectively deployed such as to produced radially into the mixed exhaust gas flow, when desired, in order to reduce the level of jet noise produced by the exhaust gas flow from the engine 10. This annular expandable section 26 of the exhaust nozzle 24 of the engine 10 provides, as will be seen, a surface texture which can deployed and retracted or otherwise modified, when required, in order to actively control the flow within the exhaust nozzle and thus control a desired amount of noise level reduction. For example, because the amount of jet noise is particularly undesirable at takeoff and landing, the expandable section 26 of the exhaust nozzle 24 may be deployed into an active position thereof for takeoff and landing, but retracted during flight at cruising altitude when jet noise is less problematic. It is also of note that the expandable section 26 of the nacelle exhaust nozzle 24 could constitute part of a thrust reverser assembly of the gas turbine engine 10.

Figure 3A:
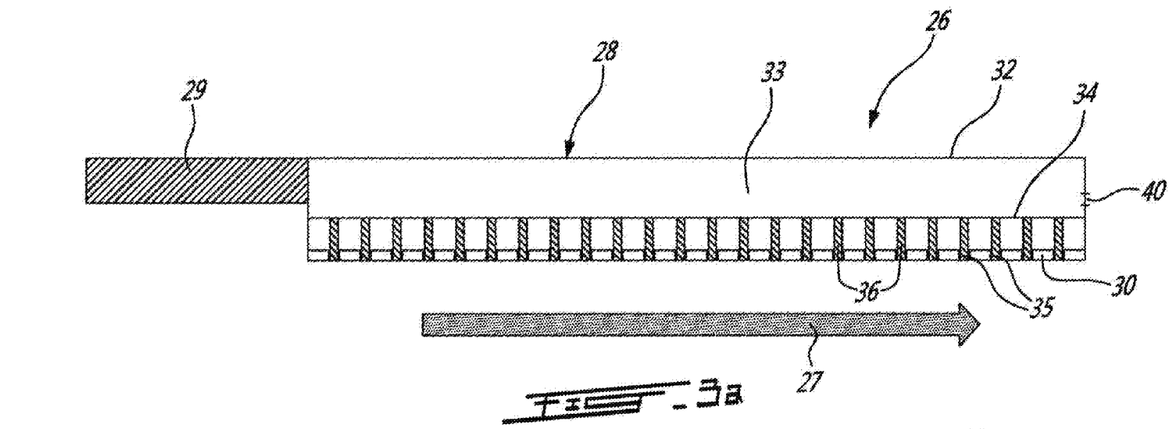
FIG. 3a is a fragmentary axial cross-section of a detailed shown in FIG. 2.
Figure 3B:
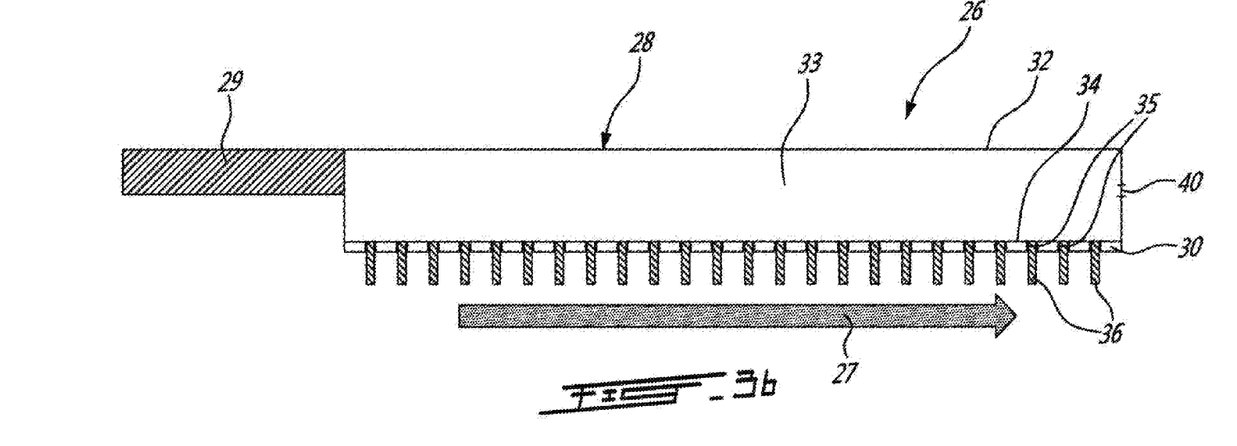
FIG. 3b is a fragmentary axial cross-section similar to FIG. 3a, showing the detail a different position.

Referring now to FIGS. 3a and 3b which depict a first embodiment of the selectively deployable noise-reduction section 26 of the gas turbine engine exhaust nozzle 24, an annular hollow metal envelope 28 forms part of the nacelle 20 and includes an inlet 29 for pressurizing the envelope 28 at an upstream end of the envelope 28. The envelope 28 includes a fixed outer circumferential wall 32 and a displaceable inner circumferential wall 34 which are substantially concentric and define therebetween and annular cavity 33 which is in fluid communication with the inlet 29 and which is adapted to be pressurized. A perforated sleeve 30 having a plurality of perforations or openings 35 is located radially inwardly of the inner wall 34 in the loft line of the nacelle 20. The inner wall 34 is provided with a plurality of flow obstructing elements, such as pins 36, thereon which are aligned with the openings in the perforated sleeve 30 and sized such as to be received within and insertable through the openings 35. Accordingly, when the envelope 28 is in its non-pressurize state (i.e. the annular cavity 33 is not pressurized), the pins 36 do not project beyond the sleeve 30, as shown in FIG. 3a.

When noise reduction is desired, such as on takeoff or landing, the envelope 28 of the noise-reduction section 26 of the nacelle exhaust nozzle 24 is pressurized by allowing high pressure air to enter into the annular cavity 33 via the inlet 29. The high pressure air may come from the engine or from an independent source. The pressurization may also be provided by using oil pressure or other hydraulic systems. This pressurization of the cavity 33 of the envelope 28 will cause the inner wall 34 to move radially inwardly so that the inner wall 34 abuts the perforated sleeve 30 and the pins 36 extend through the openings 35 in the perforated sleeve 30 and protrude into the mixed exhaust airflow 27 which exists the exhaust nozzle 24 of the nacelle 20, as shown in FIG. 3b. This constitutes the "active" state of the selectively-deployable noise-reduction section 26.

When the noise-reducing section 26 is in the active state as seen in FIG. 3b, the protruding pins 36 thereby form a rough surface on the inner surface of the exhaust nozzle 24, which increases the boundary layer thickness at the inner loft line, thereby slowing down the exhaust stream close to this inner aft surface of the exhaust nozzle 24. Since the mixing phenomenon between the mixed engine exhaust flow 27 and the ambient free stream air 25 is initiated by the velocity differential between the two streams, a reduction in the velocity of the mixed exhaust gas stream 27 will reduce the velocity differential therebetween, thereby reducing the mixing, and thus reducing the noise generated by this mixing. It is noted however that this operation will result in an increase in drag and fuel consumption. Accordingly, the noise-reducing section 26 is only selectively deployable, rather than being permanently deployed in its active (i.e. noise-reducing) mode, such that the flow disrupting pins 36 only protrude into the exhaust gas flow 27 when noise reduction is desired, but can be withdrawn when reduced drag and fuel consumption are desired. This is achieved, as noted above, by pressurizing the cavity 33 within the envelope 28, which allows the crew to deploy the pins 36 of the noise-reducing section 26 of the exhaust nozzle 24 to create the rough boundary surface only when the noise level is considered undesirably high, for example, when the aircraft is near airport buildings or near populated areas, such as at takeoff and landing. When the aircraft is at higher elevations, the engine noise level is less conspicuous and not noticeable to the passengers within the aircraft, such that the pins 36 may be retracted, thereby creating a smooth surface at the nacelle loft line, thus reducing the drag during cruising attitudes. This will also restore reduced fuel consumption.

Figure 4A:
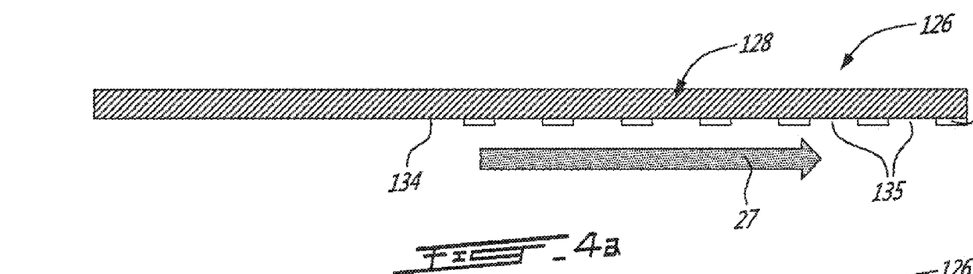
FIG. 4a is a schematic fragmentary axial cross-section of another embodiment of the detailed shown in FIG. 7.
Figure 4B:
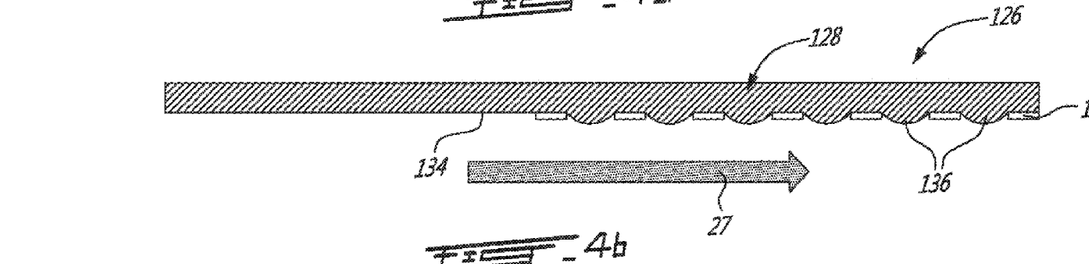
FIG. 4b is a schematic fragmentary axial cross-section similar to FIG. 4a, showing the detail in a different position.
Figure 4C:
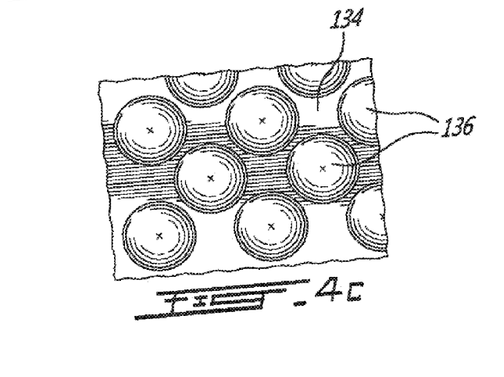
FIG. 4c is an enlarged plan view of a detail shown in FIG. 4b.
Figure 5A:
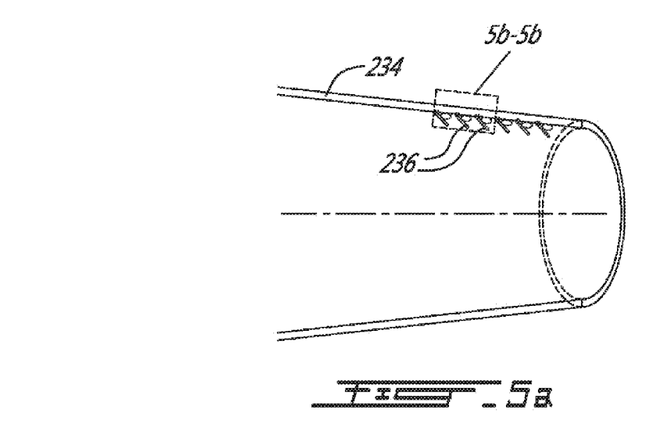
FIG. 5a is a schematic view of a further embodiment thereof.
Figure 5B:
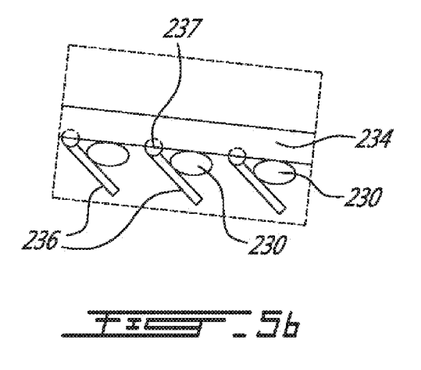
Figure 5C:
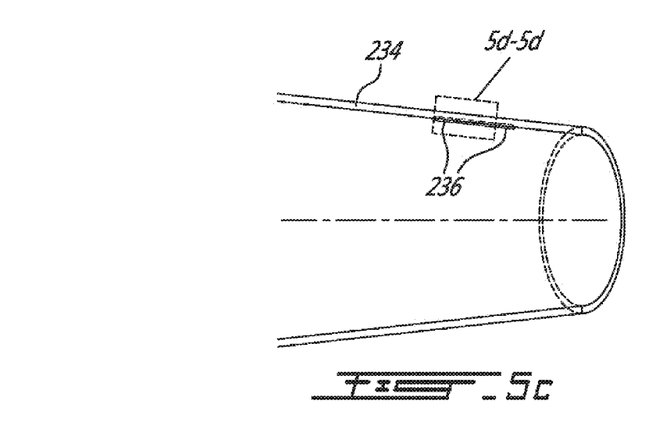
FIG. 5c is a schematic view of the detail shown in FIGS. 5a and 5b in a different operative position.
Figure 5D:
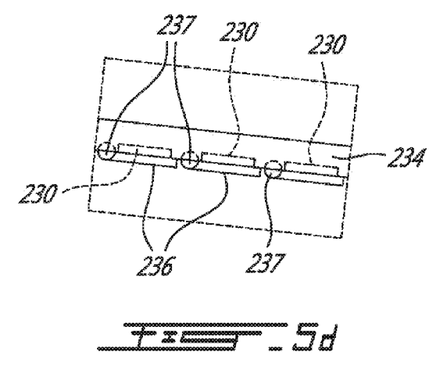
FIG. 5d is an exploded view of the detail shown in FIG. 5c

In another embodiment as shown in FIGS. 4a and 4c, the noise-reducing section 126 operates similarly to that described above and shown in FIGS. 3a-3b, however in this alternate embodiment the noise-reducing section 126 comprises dimples 136, in lieu of the previously described pins 36, which can be deployed such that they protrude into the exhaust gas flow 27 (as seen in FIG. 4b) and therefore act to reduce the noise produced or can be retracted (as seen in FIG. 4a) such as to reduce drag and fuel consumption but not jet noise levels. As seen in FIGS. 4a and 4b, the dimples 136 may be formed by the deformation of the inner wall 134 when the envelope 128 is pressurized. In this embodiment, the inner wall 134 may be formed of a flexible material which allows elastic deformation, within the openings 135, when the cavity within the envelope 128 is pressurized thereby forcing the inner wall 135 inward to form the radially protruding dimples 136 when in the device is in the active mode. The dimples 136 thus protrude through the openings 135 in the perforated sleeve 130 to provide the rough boundary layer surface in the mixed exhaust gas flow 27 exiting from the exhaust nozzle 24. As seen in FIG. 4c, the dimples 136 in their deployed or active mode may be provided in a staggered configuration across the surface of the noise-reducing section 126 within the exhaust nozzle 24 of the nacelle 20, such as to produce the rough surface of the inner loft line which reduces jet noise.

When the engine is started, and the engine control instruments detect a "weight-on-wheels", air is supplied to the inlet port 29 of the envelope 28, 128 of the noise-reducing section 26, 126 within the exhaust nozzle 24 or thrust reverser, thus pressurizing and/or inflating the envelope 28, 128 and thereby causing the pins 36 or the dimples 136 to project through the perforated sleeve 30, 130 and into the exhaust gas flow 27. These projecting pins or dimples 136 accordingly act as flow disturbing elements which provide a rough boundary layer surface which results in relatively lower noise levels being produced. The envelope 28, 128 will remain pressurized and/or inflated, with the pins 36 or dimples 136 deployed in their "active" mode, throughout the taxiing and at least through the initial part of the takeoff, thereby providing a reduction in the mixing noise at the critical sideline and flyover conditions. Upon reaching a certain altitude, whereby noise is less of a concern, the air supply to the inlet 29 is restricted or otherwise stopped and the residual air within the envelope 28, 128 is discharged through an exit port 40 (see FIGS. 3a-3b). The exit port may be located anywhere on the nacelle. This allows for the retraction of the protruding pins 36 or dimples 136 back into the envelope 28, 128 (as seen in FIGS. 3a and 4a) thereby leaving the inner surface of the perforated sleeve 30, 130 relatively smooth, which reduces the drag and fuel consumption.

In a further embodiment, as shown in FIGS. 5a to 5d. The wall 234 of the exhaust nozzle 24 is structurally supportive of the nozzle eliminating the need for sleeve 30. A plurality of inflatable tubes 230 are integrated into the inner wall 234. Flaps 236 are hinged at 237, just upstream of the inflatable tubes 230. The flaps 236, when retracted, lie in the loft line. In order to deploy the flaps 236. A pressurized fluid is injected into the tubes 230, thus expanding the tubes 230 and causing the flaps 236 to deploy thus forming a roughened surface at the loft line. At the opportune time, the tubes 236 are depressurized, thus allowing the flaps 236 to be retracted, by the force of the exhaust gases, against the inner wall 234.

When the landing gear is deployed upon descent of the aircraft, the air supply to the inlet port 29 is once again resumed and the envelope 28, 128 is again pressurized and/or inflated such as to deploy the projecting pins 36 or dimples 136 through the perforated sleeve 30, 130 and thereby providing noise reduction under approach conditions. As noise reduction is more desirable at lift-off and landing than the resultant penalties in increased drag and fuel consumption, the increased fuel consumption is acceptable given the improvements in noise levels. Still other modifications which fall within the scope of the present invention will be apparent to those skilled in the art, in light of a review of this disclosure, and such modifications are intended to fall within the appended claims.

The invention claimed is:

1. A gas turbine engine comprising: an engine core having a core exit nozzle within an annular by-pass duct defined within a surrounding nacelle, the nacelle having an exhaust nozzle at an aft end thereof; a selectively deployable noise-reduction section on an inner surface of the aft end of the nacelle exhaust nozzle, said inner surface of the aft end of the nacelle exhaust nozzle being downstream of the core exhaust nozzle and receiving mixed exhaust gas flow, including core engine gas flow and bypass air flow, therethrough, the noise-reduction section including at least one inflatable envelope, projections deployable from the inner wall of the nacelle exhaust nozzle to form a rough surface at the loft line of the inner wall when the envelope is pressurized and the projections are retracted when the envelope is de-pressurized; means are provided to retain the inner wall in the loft line, the so formed rough surface effectively thickens the boundary layer to reduce the speed of the mixed flow of engine exhaust and by-pass air at the outer radius of the nozzle to reduce the differential velocity with the ambient air thus reducing the jet noise level of the engine, wherein the selectively deployable noise-reduction section on the inner surface of the aft end of the nacelle exhaust nozzle, including the inflatable envelope comprising a fixed outer wall and a displaceable inner wall radially spaced apart therefrom, the envelope including metal walls defining a pressurizable cavity and an inlet in fluid communication with the pressurizable cavity, at least a portion of the inner wall being radially inwardly displaced when the envelope is pressurized and retracted radially outwardly when the envelope is de-pressurized; an annular perforated sleeve having a plurality of openings therein and provided on the inner nacelle loft line, radially inwardly of the inner wall, to limit the travel of the inner wall; and wherein the inner wall includes a plurality of pins which are aligned with the plurality of openings in the perforated sleeve, the pins projecting through the openings in the perforated sleeve when the envelope is pressurized to form the rough surface at the loft line of the inner wall of the nacelle exhaust nozzle to thereby thicken the boundary layer and reduce the speed of the mixed flow of engine exhaust and by-pass air at the outer radius of the nozzle to reduce the differential velocity with the ambient air thus reducing the jet noise level of the engine.

2. The gas turbine engine as defined in claim 1, further comprising a control system operable to pressurize the envelope when noise-reduction is desired, and depressurize the envelope when reduced fuel consumption is more desired than noise-reduction.

3. The gas turbine engine as defined in claim 2, wherein said control system is operable to vary the pressure within said envelope to actively control the jet noise level during operation of the gas turbine engine.

4. A gas turbine engine comprising an engine core including a core exhaust nozzle and an annular by-pass duct defined between the engine core and a surrounding nacelle, the nacelle having an exhaust nozzle at an aft end thereof through which exhaust gas flow exits, the nacelle exhaust nozzle having a selectively deployable noise-reducing component therewithin on an inner surface thereof, said inner surface of the nacelle exhaust nozzle being downstream of the core exhaust nozzle and receiving mixed exhaust gas flow, including core engine gas flow and bypass air flow, therethrough, the noise-reducing component including an annular perforated sleeve positioned to coincide with the inner nacelle loft line and circumscribing a mixed exhaust gas flow exiting the nacelle, the annular perforated sleeve being disposed radially inwardly of a displaceable inner wall of an inflatable envelope, the inner wall being radially displaceable between a deployed position wherein noise-reduction is active and a retracted position wherein noise-reduction is inactive, the inner wall being displaced from the retracted position to the deployed position when the inflatable envelope is pressurized thereby forcing a plurality of pins provided on the inner wall to project through corresponding openings in the perforated sleeve and into the exhaust gas flow to form a rough surface at the loft line of the nacelle exhaust nozzle, causing a reduction in the noise level of the gas turbine engine.

5. A gas turbine engine as defined in claim 4, wherein a pressurised inlet is in fluid communication with the inflatable envelope.

6. A gas turbine engine as defined in claim 4, wherein the portions of said inner wall that project through the openings when the inflatable enveloped is pressurized include pins which project from the inner wall and protrude into the mixed exhaust gas flow.

7. The gas turbine engine as defined in claim 4, further comprising a control system operable to pressurize the envelope when noise-reduction is desired, and depressurize the envelope when reduced fuel consumption is more desired than noise-reduction.

8. The gas turbine engine as defined in claim 7, wherein said control system is operable to vary the pressure within said envelope to actively control the jet noise level during operation of the gas turbine engine.

9. A gas turbine engine comprising an engine core including a core exhaust nozzle and an annular by-pass duct defined within a surrounding nacelle, the nacelle having an exhaust nozzle which includes a selectively deployable noise-reduction section on an inner surface thereof, said inner surface of the nacelle exhaust nozzle being downstream of the core exhaust nozzle and receiving mixed exhaust gas flow, including core engine gas flow and bypass air flow, therethrough, the noise-reduction section defining an inflatable envelope comprising a fixed outer wall, a displaceable inner wall radially inward of the fixed outer wall, and an annular perforated sleeve radially inward of the inner wall and facing an exhaust gas flow exiting the exhaust nozzle, at least a portion of the inner wall being radially inwardly displaced when the envelope is pressurized and retracted radially outwardly when the envelope is de-pressurized, wherein the inner wall including a plurality of pins thereon that are aligned with and extend through openings in the perforated sleeve, the pins protruding through the perforated sleeve extending into the exhaust gas flow to form a rough surface on the inner surface of the nacelle exhaust nozzle when the envelope is pressurized, thereby reducing a level of jet noise produced, and wherein said projections being retracted upon depressurization of the envelope such that the inner surface is smooth thereby increasing the level of the jet noise but decreasing fuel consumption.

10. The gas turbine engine as defined in claim 9, further comprising a control system operable to pressurize the envelope when noise-reduction is desired, and depressurize the envelope when reduced fuel consumption is more desired than noise-reduction.

11. The gas turbine engine as defined in claim 10, wherein said control system is operable to vary the pressure within said envelope to actively control the jet noise level during operation of the gas turbine engine.

12. A method for reducing the level jet noise produced by a gas turbine engine having a engine nacelle from which an exhaust gas flows, comprising pressurizing an inflatable portion of an exit nozzle of the engine nacelle to displace an inner wall of the inflatable portion radially inwardly such that a plurality of pins on the inner wall protrude through a plurality of openings formed in an annular perforated sleeve radially inward of the inner wall and facing an exhaust gas flow exiting the exhaust nozzle, the pins extending into the exhaust gas flow at the loft line of the nacelle so as to form a rough surface at the loft line to thereby reduce the exhaust velocity as it mixes with ambient free air shear surrounding the nacelle and thus reduce the level of jet noise produced, wherein the inflatable portion of the exit nozzle of the engine nacelle is downstream of a core exhaust nozzle of the gas turbine engine within the engine nacelle, said inflatable portion of the exit nozzle of the engine nacelle receiving mixed exhaust gas flow, including core engine gas flow and bypass air flow, therethrough; restricting the pressurized air to the inflatable portion at a predetermined altitude so that flight will proceed with the projecting portions retracted from the loft line and withdraw within the exit nozzle of the engine nacelle; and initiating the pressurized fluid to the inflatable portion in preparation for landing thereby re-forming the rough surface within the exit nozzle of the engine nacelle to thereby reduce the level of jet noise produced during landing.

* * * * *